March 26, 1957 W. F. WITTE, JR 2,786,634
HOT WATER HEATING SYSTEM
Filed Sept. 7, 1954 2 Sheets-Sheet 1
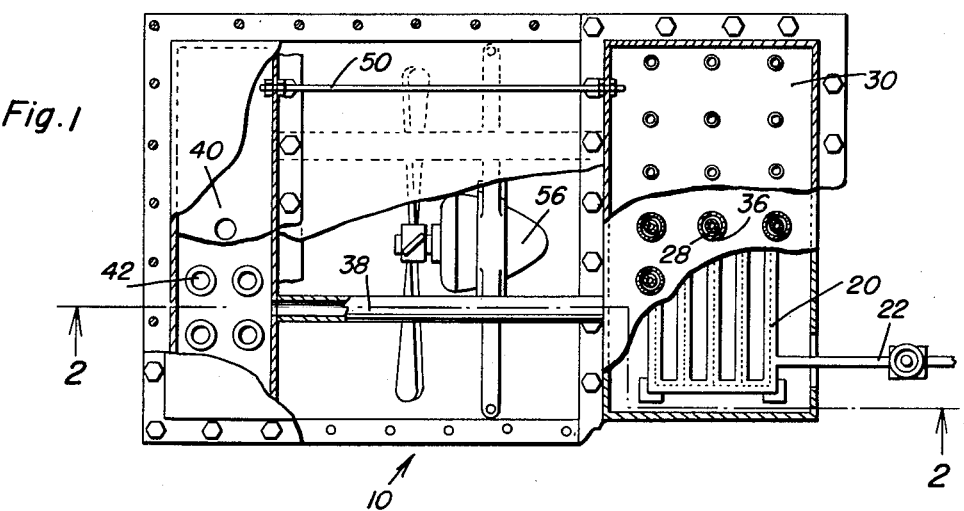
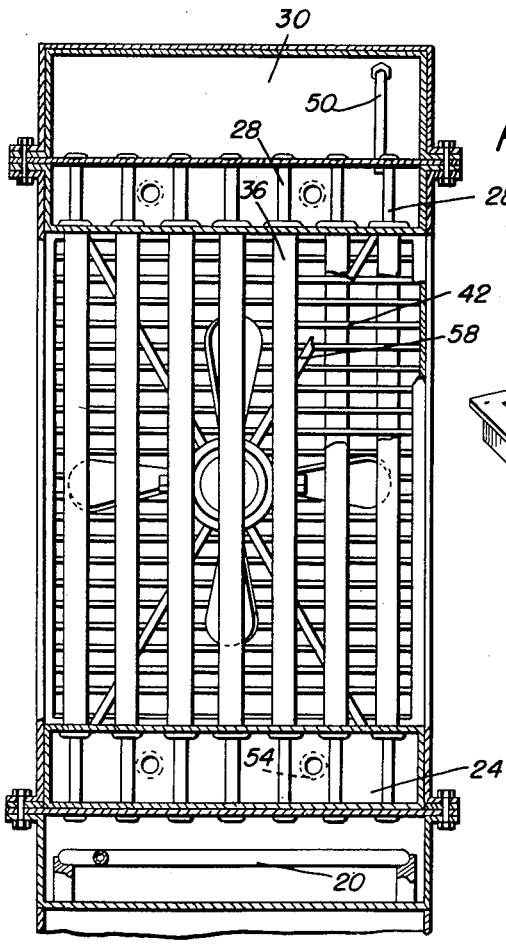
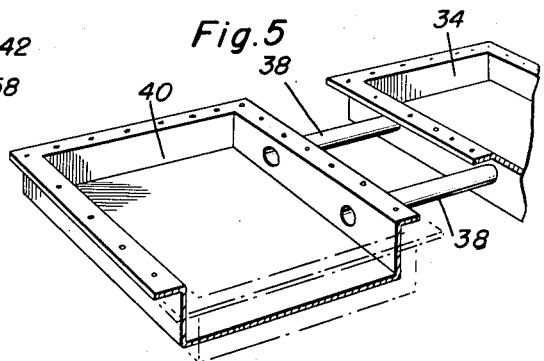
William F. Witte, Jr.
INVENTOR.

March 26, 1957  W. F. WITTE, JR  2,786,634
HOT WATER HEATING SYSTEM
Filed Sept. 7, 1954  2 Sheets-Sheet 2
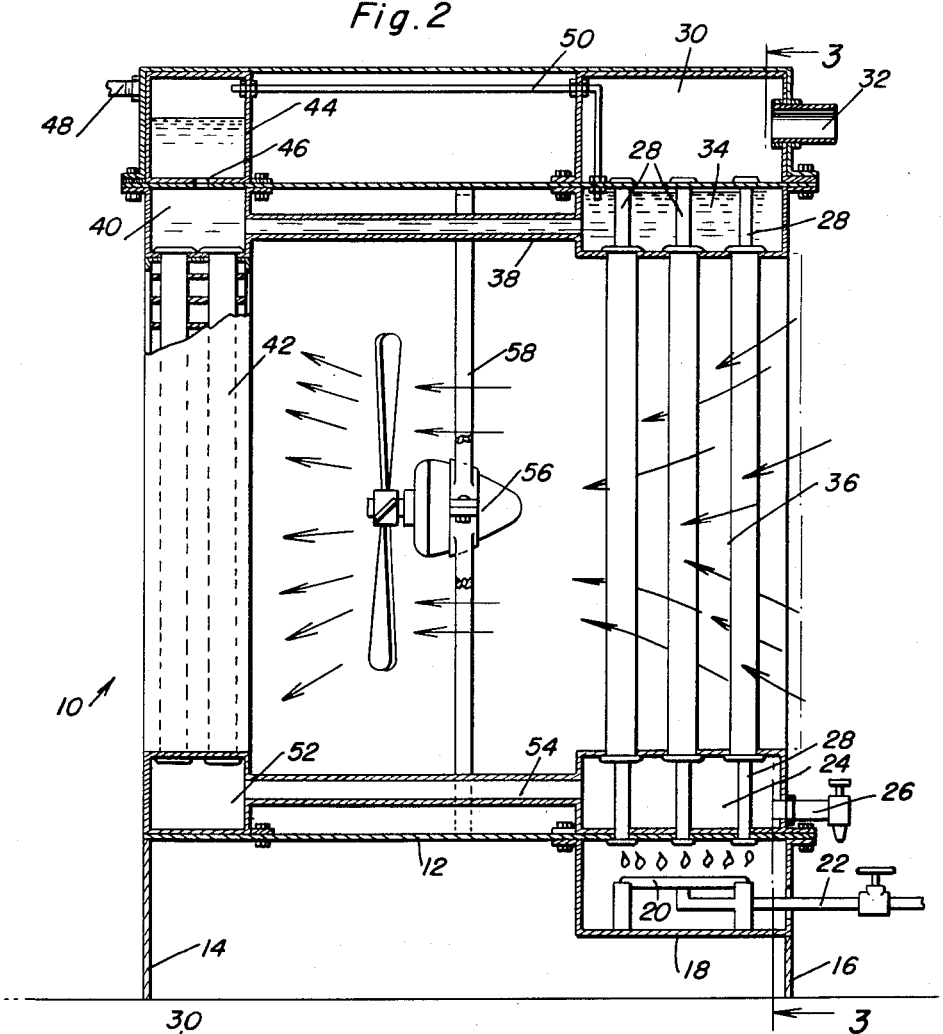
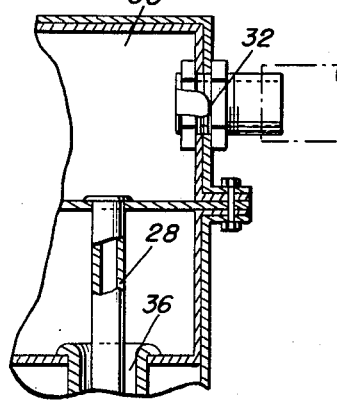
William F. Witte, Jr.
INVENTOR.

United States Patent Office 2,786,634
Patented Mar. 26, 1957

2,786,634

HOT WATER HEATING SYSTEM

William F. Witte, Jr., Nebraska City, Nebr.

Application September 7, 1954, Serial No. 454,510

2 Claims. (Cl. 237—17)

This invention relates to the class of heating and ventilating, and more particularly to a novel hot water heating system.

The primary object of the present invention resides in the provision of a highly efficient hot water heating system designed to provide adequate heating for any suitable compartment within which the system is located.

The construction of this invention features the utilization of a blower for drawing air across hot water tubes and thence through a radiator so as to impart heat to the air so that the air, by radiation and convection, will provide suitable heating for a home, office or other suitable building in which the hot air heating unit is utilized.

Another object of the invention resides in the provision of a hot water heating system having a novel arrangement for recirculating previously heated water and for maintaining the supply of water at a substantially constant level.

Still another advantage of the invention resides in the provision of a hot water heating system having means for preventing the entrapment of air or other gas within the water circulating portions of the system and which includes means for releasing entrapped gases. The invention utilizes a very small amount of water and is very inexpensive to operate.

Still further objects and features of this invention reside in the provision of a hot water heating system that is comparatively simple to manufacture, highly efficient in operation, substantialy foolproof in operation and capable of blowing heated air a considerable distance so as to heat substantially all the portions of a compartment in which the hot air heating unit is situated.

These, together with the various ancillary objects and features of the invention which will become apparent as the following description proceeds, are attained by this hot water heating system, a preferred embodiment of which has been illustrated in the accompanying drawings, by way of example only, wherein:

Figure 1 is a plan view of the hot water heating system with parts thereof being broken away to show other parts in greater detail;

Figure 2 is a vertical sectional view taken along the planes of line 2—2 in Figure 1 illustrating the water circulating system in detail;

Figure 3 is a vertical sectional view as taken along the plane of line 3—3 in Figure 2;

Figure 4 is an enlarged sectional detail view of the upper end construction of the fire tubes and hot water tubes; and Figure 5 is a partial perspective view of the upper blower compartment and mixing chamber and the conduits joining these members.

With continuing reference to the accompanying drawings wherein like reference numerals designate similar parts throughout the various views, reference numeral 10 generally designates the hot water heating system comprising the present invention. This hot water heating system includes a housing of any suitable construction which may be open and which preferably includes a base plate 12 supported by suitable legs, such as at 14 and 16 or the like and to which a burner plate support 18 is attached. A burner 20 which has a suitable gas supply connected thereto by means of pipe 22, is positioned beneath the base plate 12 and a hot water heating tank 24 is positioned directly above the burner 20. A suitable outlet valve 26 may be connected to the hot water tank 24.

Extending through the hot water tank 24 and opening therebelow immediately above the burner 20 are fire tubes 28 for transferring the fumes of combustion upwardly into an exhaust chamber 30 and out of the exhaust tube 32. The fire tubes 28 extend upwardly through a compartment 34 positioned above the water tubes 36 which provides means for communication between the heating tank 24 and the compartment 34. The water tubes 36 are concentrically disposed about the fire tubes 28, and thus, the hot gases of combustion will aid in the further heating of the water heated by the burner and rising from the tank 24 to the compartment 34.

By means of a suitable conduit 38, communication between the compartment 34 and a mixing chamber 40 is provided, the mixing chamber 40 being disposed above a suitable radiator 42 and below a water intake tank 44. The water intake tank is arranged in communication with the mixing chamber 40 by means of suitable apertures 46 through the plates of the tank 44 and of the mixing chamber 40. A suitable water inlet 48 is provided for maintaining the hot water heating system with the proper quantity of water for circulation and the intake tank 40 may be suitably vented so that a vent pipe 50 interconnecting the chamber 34 with the tank 44 will suitably vent the entire system of entrapped air or the like. Such water from the intake tank 40 as is necessary to replenish the system flows downwardly with the heated water from the conduit 38 through the radiator 42 and into a chamber 52 from whence the water passes through suitable conduits, as at 54, to the heating tank 24.

Mounted between the hot water pipes 36 and the radiator 42 is a blower 56 in the form of a fan or the like carried by suitable supports 58 so as to suck in air over the pipes 36 and then blow the partially heated air through the radiator 42 to further heat the air and to disseminate the heat of the system into the compartment in which the hot water heating system 10 is located. The fan 56 may be a suitably electrically driven device and of such size and construction as is necessary for maximum efficiency of the invention.

Automatic controls of conventional construction may be provided for room temperature control, water heating control and fan control.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A hot water heating system comprising a housing, a blower mounted in said housing for moving air therethrough, a burner, a water heating tank above said burner, water tubes and fire tubes, a walled compartment above the water tubes, said fire tubes communicating with said burner and exhausting remote from the burner, said water tubes communicating between said heating tank and a compartment above said water tubes, a water intake tank, a mixing chamber in communication with said intake tank, a conduit between said mixing chamber and said compartment, and a radiator receiving fluid from said mixing chamber, said radiator discharging into said heating system and communicating with said water heating tank for delivering fluid to said water heating tank, said water tubes being concentrically disposed about said fire tubes, and a vent tube between said compartment and said intake tank, said blower being adapted to move air between the water tubes and through the radiator for heating the air, said blower being disposed between said water tubes and said radiator.

2. A hot water heating ssytem comprising a housing, a blower mounted in said housing for moving air therethrough, a burner, a water heating tank above said burner, water tubes and fire tubes, a walled compartment above the water tubes, said fire tubes communicating with said burner and exhausting remote from the burner, said water tubes encircling said fire tubes and communicating between said heating tank and a compartment above said water tubes, a water intake tank, a mixing chamber in communication with said intake tank, a conduit between said mixing chamber and said compartment, and a radiator receiving fluid from said mixing chamber, said radiator discharging into said heating system and communicating with said water heating tank for delivering fluid to said water heating tank, said blower being disposed between said water tubes and said radiator and adapted to suck air past said water tubes and drive the air through said radiator.

References Cited in the file of this patent

UNITED STATES PATENTS

| | | |
|---|---|---|
| 205,304 | Sullivan | June 25, 1878 |
| 635,923 | Fanning | Oct. 31, 1899 |
| 1,635,869 | Weisz | July 12, 1927 |
| 1,884,634 | Emans | Oct. 25, 1932 |
| 2,080,949 | McCombs | May 18, 1937 |
| 2,201,406 | Miller | May 21, 1940 |
| 2,234,869 | Loveless | Mar. 11, 1941 |
| 2,260,895 | Gibson | Oct. 28, 1941 |
| 2,276,093 | Robbins | Mar. 10, 1942 |